3,108,108
AZA ANALOGUES OF POLYNUCLEAR
o-QUINONES
Carl-Wolfgang Schellhammer, Leverkusen, and Gerhard Domagk, Wuppertal-Elberfeld, Germany, assignors to Farbenfabriken Bayer Aktiengesellschaft, Leverkusen, Germany, a corporation of Germany
No Drawing. Filed Sept. 9, 1960, Ser. No. 54,839
Claims priority, application Germany Sept. 25, 1959
4 Claims. (Cl. 260—288)

It is known that polynuclear o-quinones are formed during the condensation of 2,3-dichloro-1,4-naphthoquinones with nitrogen-containing heterocyclics which carry an amino group in the α-position to the ring nitrogen atom [W. L. Mosby and R. J. Boyle, J. Org. Chem. 24 (1959), 374–380].

It has now been found that aza-analogues of the above-mentioned polynuclear o-quinones are obtained when 6,7-dihalogeno-5,8-quinoline quinone or 6,7-dihalogeno-5,8-quinaldine quinone are condensed with equivalent amounts of nitrogen-containing heterocyclics which carry a primary amino group in the α-position to the ring nitrogen atom, and which may be further substituted by alkyl-, halogen- or amino groups in the presence of a solvent and an acid binding compound, which may be a second equivalent of the reacted amine of temperatures of 60–140° C.

As heterocyclic amines, which in addition to the primary amino group in the α-position to the ring nitrogen atom may still carry further substituents, such as alkyl groups, halogen atoms, or further amino groups, it is possible to use, e.g., 2-aminopyridine, 2-aminopyrimidine, 2-aminothiazole, or 1,3,5-triazine derivatives with at least one primary amino group.

As reaction medium for the condensation, it is possible to employ, e.g., methanol, ethanol, methylglycol, ethylglycol, or glycol monomethyl ether acetate. The reaction which proceeds during 2–30 hours is carried out at temperatures of 60–140° C.

The novel polynuclear o-quinones are obtained as yellow to red small crystals which decompose on heating to quite high temperatures.

The novel compounds possess bacteriostatic properties. For comparison with previously known polynuclear o-quinones, comparison is made, e.g., of the inhibition data for various bacteria by the condensation product of 2-aminopyridine with 2,3-dichloro-1,4-naphthoquinone (I) and by the novel aza-analogue (II).

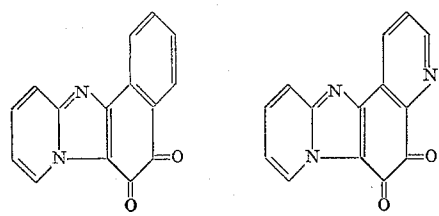

| Type of bacteria | Total inhibition at concentrations of— | |
|---|---|---|
| | I | II |
| Streptoc. haem | 1:10,000 | 1:400,000 |
| Staphylococci | 1:10,000 | 1:400,000 |
| Coli | 1:1,000 | 1:25,000 |
| M. tuberc. H 37 Rv | 1:10,000 | 1:100,000 |
| M. tuberc. RS 125 | 1:1,000,000 | 1:10,000,000 |

RS 125=M. tuberc. resistant towards isonicotinic acid hydrazide and thiosemicarbazones.

The novel polynuclear o-quinones which are also effective in the form of their acetylated hydroquinones may be employed as therapeutic agents by themselves or in admixture with other compounds suitable as therapeutic agents, e.g. in the form of tablets or solutions.

Example 1

68.5 g. of 6,7-dichloro-5,8-quinoline quinone in 500 cc. of ethanol are heated with stirring under reflux for 8 hours with 56.5 g. of 2-aminopyridine. The mixture turns to a red colour almost immediately. It is filtered by suction on the following day, washed with alcohol and ether, and recrystallised from N,N-dimethylformamide. 49 g. of orange-red crystals are obtained which decompose on heating to 310–311° C.

It has the following structure:

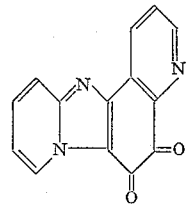

Example 2

19.5 g. of 6,7-dichloro-5,8-quinaldinequinone and 16 g. of 2-aminopyridine are heated in 130 cc. of ethanol under reflux for 8 hours. After several hours, red-brown small crystals start to separate at the edge of the reaction mixture, which turns to a red colour almost immediately. It is filtered by suction on the following day, washed with alcohol and ether, and recrystallised from N,N-dimethylformamide or 1,2,4-trichlorobenzene. Dark red prisms or orange-red microcrystals are obtained which melt with decomposition at 296–298° C.

It has the following structure:

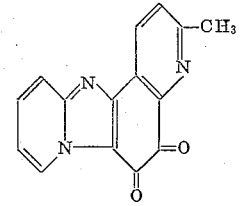

Example 3

A mixture of 23 g. of 6,7-dichloro-5,8-quinolinequinone, 27 g. of 5-chloro-2-aminopyrimidine, and 500 cc. of alcohol are heated with stirring under reflux for 20 hours. After cooling, it is filtered off by suction, washed with water, alcohol, and ether, and dried at 100°. For purification, it is recrystallised from 1,2-dichlorobenzene. Yellow-orange small needles are obtained which decompose at 352–354° C.

It has the following structure:

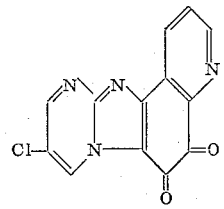

Example 4

23 g. of 6,7-dichloro-5,8-quinolinequinone and 23 g. of 4-methyl-2-aminothiazole in 300 cc. of methylglycol are heated under reflux for 25 hours. After cooling, the separated dark crystals are filtered off by suction, washed with water, alcohol, and ether, and recrystallised from n-butanol. Red-brown small crystals are obtained which decompose on heating above 360° C.

It has the following structure:

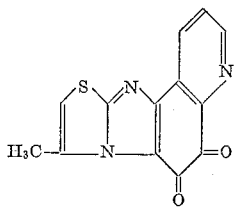

*Example 5*

23 g. of 6,7-dichloro-5,8-quinoline quinone and 25 g. of melamine in 200 cc. of ethylglycol are heated under reflux for 30 hours. After cooling, the carmine red reaction product is filtered off by suction, washed with much boiling water, alcohol, and ether, and dried at 110° C. For purification, the small crystals which are readily soluble in concentrated acids and dilute alkalis can be recrystallised from dimethyl sulfoxide. The substance decomposes at temperatures above 360° C.

It has the following structure:

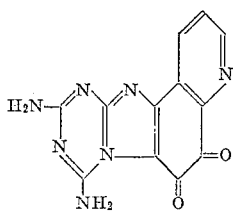

*Example 6*

228 g. of 6,7-dichloro-5,8-quinoline quinone, 108 g. of 5-methyl-2-amino-pyridine and 106 g. of sodium carbonate are heated in ethanol for 12 hours with stirring and refluxing. After working up in the manner described in Example 1 and recrystallisation of the product from N,N-dimethylformamide, 187 g. of a crystalline orange-coloured product with a melting point of 340° C. (decomposition) are yielded. The product has the following structure:

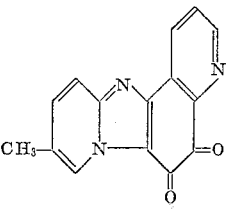

We claim:
1. A compound of the formula:

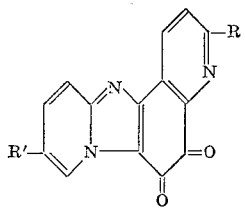

wherein each of R and R' is selected from the group consisting of hydrogen and methyl.

2. The compound of the formula

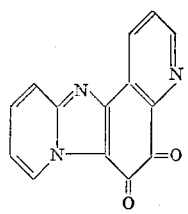

3. The compound of the formula

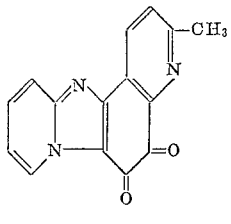

4. The compound of the formula

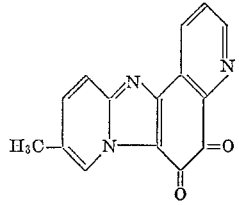

References Cited in the file of this patent
UNITED STATES PATENTS

| | | |
|---|---|---|
| 2,626,950 | Gregory | Jan. 27, 1953 |
| 2,868,788 | Luvisi | Jan. 13, 1959 |
| 2,901,485 | Brody et al. | Aug. 25, 1959 |
| 2,970,146 | Boyle et al. | Jan. 31, 1961 |